United States Patent
Maeda et al.

(10) Patent No.: US 6,557,438 B2
(45) Date of Patent: May 6, 2003

(54) BREATHER STRUCTURE OF INTERNAL COMBUSTION ENGINE FOR VEHICLES

(75) Inventors: Tetsuaki Maeda, Saitama (JP); Shinji Kuga, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/881,100

(22) Filed: Jun. 15, 2001

(65) Prior Publication Data

US 2002/0005191 A1 Jan. 17, 2002

(30) Foreign Application Priority Data

Jun. 15, 2000 (JP) .................................... 2000-179551

(51) Int. Cl.$^7$ .............................................. F16H 57/04
(52) U.S. Cl. .................................. 74/606 R; 184/6.12
(58) Field of Search ........................... 74/606 R, 606 A, 74/607; 184/6.23, 6.12, 11.1; 474/144; 180/230, 231

(56) References Cited

U.S. PATENT DOCUMENTS

| | | | |
|---|---|---|---|
| 4,274,142 A | 6/1981 | Furuhashi et al. | |
| 4,468,979 A | * 9/1984 | Inagaki et al. | ............ 74/606 R |
| 4,485,452 A | 11/1984 | Cording et al. | |
| 4,671,782 A | * 6/1987 | Ochiai et al. | .................. 474/93 |
| 4,779,214 A | 10/1988 | Kinugasa | |
| 4,911,035 A | * 3/1990 | Taguchi | ..................... 74/606 A |
| 5,305,220 A | 4/1994 | Schöggl | |
| 5,724,864 A | * 3/1998 | Rodgers et al. | ............ 74/606 R |

FOREIGN PATENT DOCUMENTS

| | | | | |
|---|---|---|---|---|
| JP | 57094169 A | * 6/1982 | ........... F16H/57/02 |
| JP | A61160665 | 7/1986 | |
| JP | 02109787 A | * 4/1990 | ............ B62J/13/00 |
| JP | 05172214 A | * 7/1993 | ............ F16H/57/02 |
| JP | 06199260 A | * 7/1994 | ............ B62J/39/00 |

* cited by examiner

Primary Examiner—David A. Bucci
Assistant Examiner—Timothy McAnulty
(74) Attorney, Agent, or Firm—Birch, Stewart, Kolasch & Birch, LLP

(57) ABSTRACT

In the breather structure of an internal combustion engine for vehicles, an outer cover is installed through a sound absorbing material for noise suppression on the outside of a body cover. The body cover covers a power unit including at least one of the internal combustion engine and a power transmission device. An outlet of the breather provided in the power unit opens at the sound absorbing material. The present invention provides a breather structure having a simplified construction, a short breather passage, and is capable of preventing entry and attachment of dust and debris into and onto the breather structure.

10 Claims, 8 Drawing Sheets

BREATHER STRUCTURE OF INTERNAL COMBUSTION ENGINE FOR VEHICLES

BACKGROUND OF THE INVENTION

1. Field of the Invention

This invention relates to an internal combustion engine for vehicles, and more particularly to a breather structure for an internal combustion engine.

2. Description of the Background Art

Japanese Patent Laid-Open No. Sho 61-160665, which will be explained hereinafter in more detail with reference to FIG. 11, shows a major portion of an exemplary breather structure of a crankcase or a transmission case of an internal combustion engine. A transmission case 02 is located at the rear of a belt-drive case 01 in a unit-swing internal combustion engine.

A breather chamber 03 is formed in the upper part of the transmission case 02. A breather pipe 05 is longitudinally and horizontally inserted in a through hole in a partition wall 03a of the breather chamber 03 through a grommet 04.

The breather pipe 05, whose one end is inserted in the breather chamber 03 is bent downward in the belt-drive case 01, extends vertically through the lower wall of the belt-drive case 01 via a grommet 06 and opens at a lower end out to the atmosphere.

Another arrangement in the background art includes a breather tube that is extended directly outside from the transmission case with the forward end of the tube inserted into an air cleaner box to release the air.

However, the examples described above have the following drawbacks. Since the open end of the breather pipe 05 is open to the atmosphere at the lower part of the vehicle, there is a risk of the entrance of dust and debris, and the subsequent attachment of dust at the outlet depending on the layout. This can impair appearance. Further, the breather pipe 05, having its open end on the underside of the vehicle, has an unfavorable, increased length.

In the latter example, when the air cleaner box is mounted on the vehicle body frame, the belt-drive case is likely to oscillate. Therefore, it becomes necessary to increase the length of the breather tube to absorb these oscillations and/or to provide a special cleaner box for the belt-drive case.

SUMMARY OF THE INVENTION

The present invention overcomes the shortcomings associated with the background art and achieves other advantages not realized by the background art.

In view of the above-described drawbacks associated with the prior art, it is an object of this invention to provide a breather structure for an internal combustion engine of a vehicle having a simplified construction.

It is a further object of this invention to provide a breather structure that can prevent the entry/attachment of dusts into/onto a breather by using a relatively short breather passage.

These and other objects of the present invention are accomplished by a breather structure for a power unit for vehicles, the breather structure comprising a body cover having an outer side, the body cover covering the power unit; an outer cover mounted to the outer side; a sound absorbing material layer interposed between an inner surface of the outer cover and the body cover for noise suppression, and a breather assembly having an outlet provided in the power unit, the outlet of the breather provided in the power unit and opening in the sound absorbing material.

Since the breather outlet opens in the sound absorbing material interposed between the body cover covering the power unit and the outer cover located on the outside thereof, entry of dusts at the breather outlet and attachment of the dusts on the outlet can be prevented. Therefore no adverse effect will be given to the appearance.

Since it is sufficient to direct the breather outlet toward the sound absorbing material, the breather of a simple structure having a high degree of freedom of layout can be designed as short as possible.

These and other objects are further accomplished by a power unit for vehicles comprising a case enclosing a crankcase of an internal combustion engine and a transmission chamber of the power unit; a cover unit covering the case, the cover unit including an inner cover, an outer front cover, and an outer rear cover covering the inner cover; a space formed between the outer rear cover and the inner cover; a sound absorbing material layer interposed within the space for noise suppression; a transmission cover and a breather chamber; and a connecting pipe fitted through a peripheral wall of the transmission cover, and a lower end of the connecting pipe communicating the breather chamber with an outside of the transmission case via an upper end of the connecting pipe.

Furthermore, since the breather pipe has a horizontal portion of a specific length, the oil will not be forced out by up-down oscillation of the transmission case mounted on the driven pulley side of the belt-drive vehicle.

The unit-swing internal combustion engine is also provided with a transmission case on the driven pulley side of a belt-drive vehicle.

These and other objects are further accomplished by a breather structure for a power unit for vehicles having a belt-drive chamber with an air-cooled structure, the breather structure comprising a body cover having an outer side, the body cover covering the power unit; an outer cover mounted to the outer side; a sound absorbing material layer interposed between an inner surface of the outer cover and the body cover for noise suppression, a breather assembly on a transmission case mounted on a driven pulley side of a belt drive transmission of the power unit, an outlet of the breather assembly opening in the sound absorbing material and formed at a cooled-air outlet port of the belt-drive chamber.

Since the breather outlet opens in the sound absorbing material, dusts can be prevented from entering, and holding onto the breather outlet. Furthermore, oil content discharged out of the outlet of the breather extended from the transmission case is adsorbed by the sound absorbing material. However, because the breather outlet is located at the cooled air outlet of the belt-drive chamber, the sound absorbing material that has adsorbed the oil content is dried with cooled air that is warm air, and therefore can keep its adsorbing performance for a prolonged period of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention will hereinafter be described with reference to the accompanying drawings. The first embodiment of this invention will be explained with reference to FIG. 1 to FIG. 10.

Figure 1:
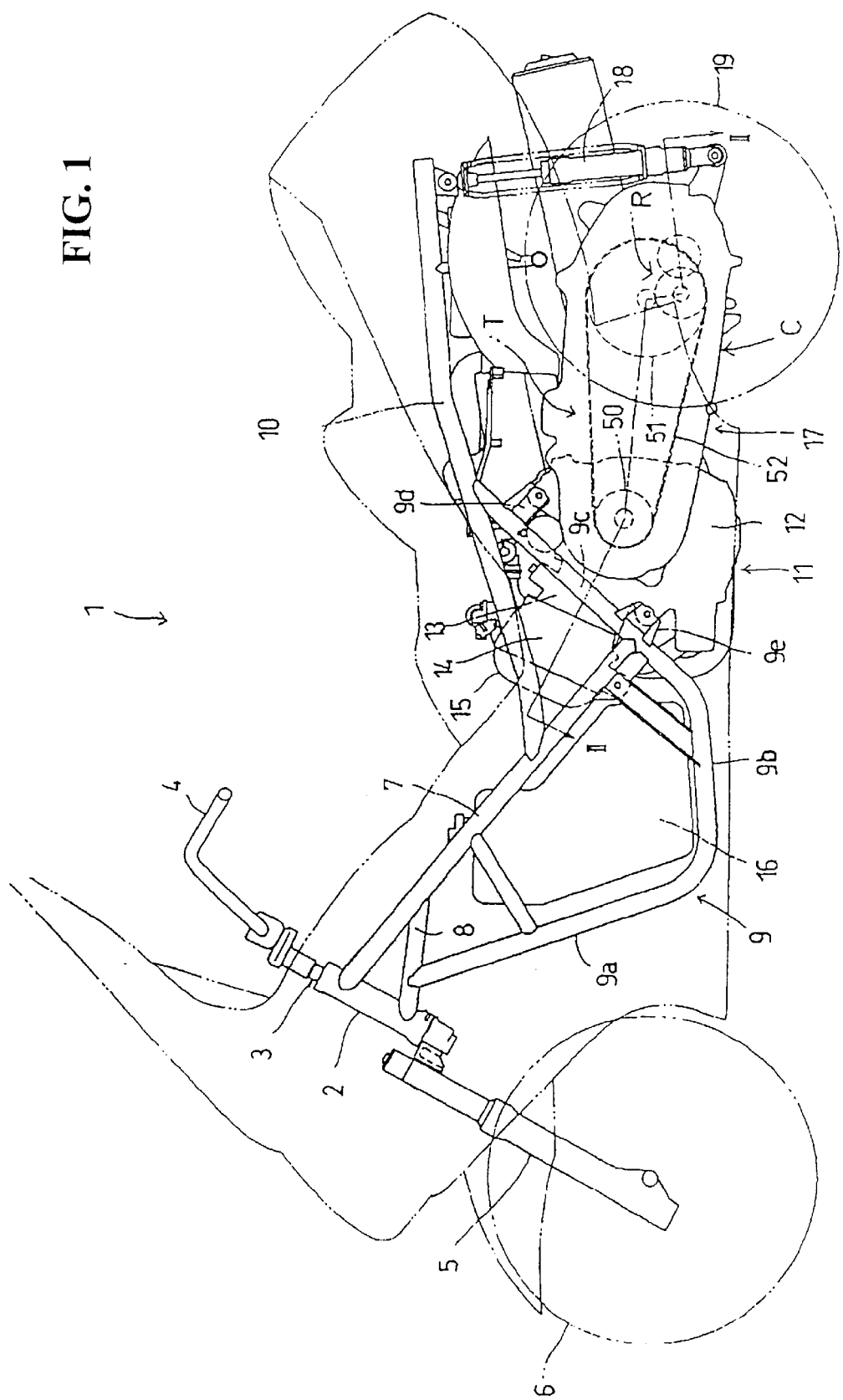
FIG. 1 is a left side view of a motorcycle mounted with a power transmission device equipped with a belt-drive transmission according to an embodiment of the present invention.
Figure 2:
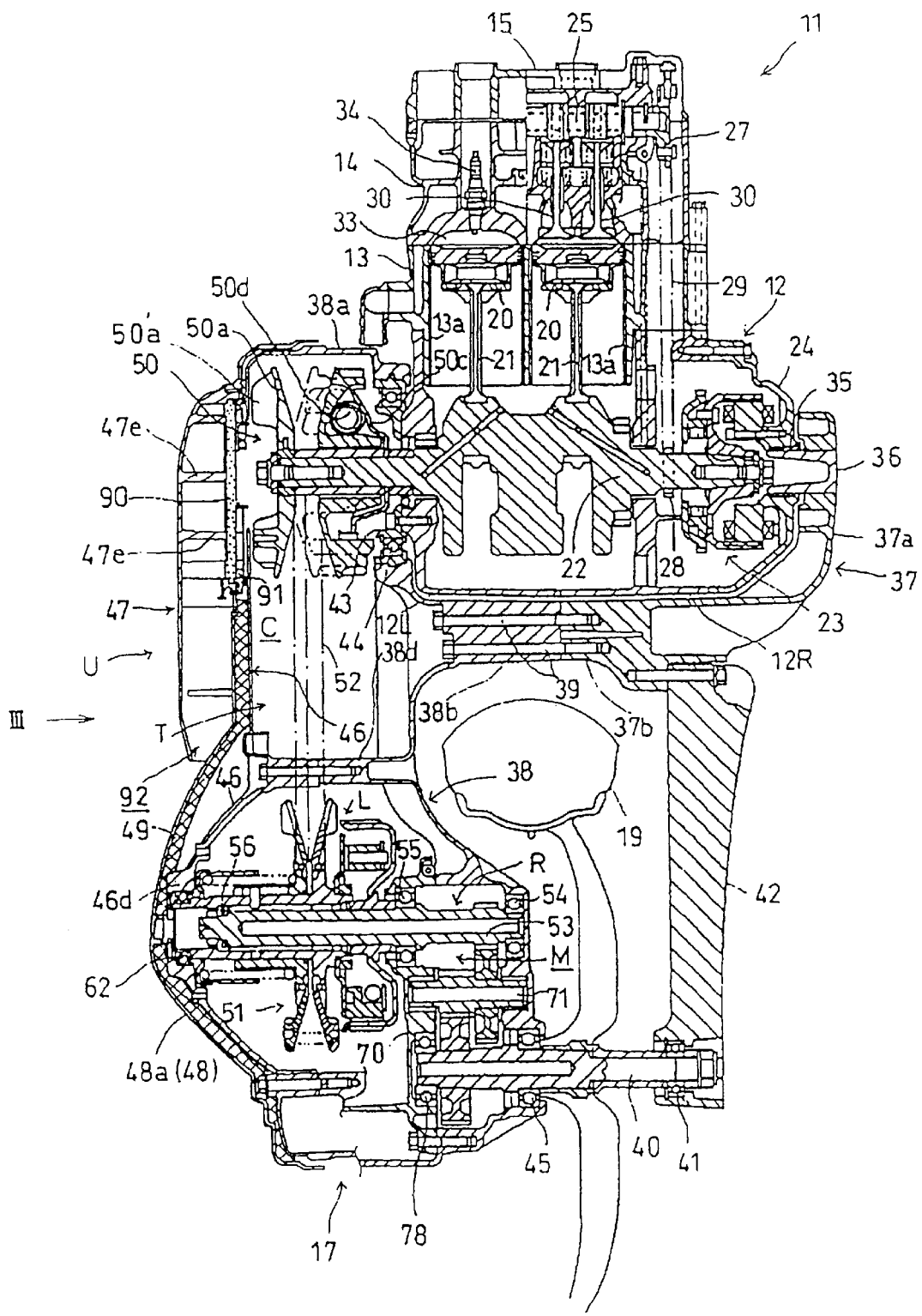
FIG. 2 is a sectional view taken along line II—II of FIG. 1.
Figure 3:
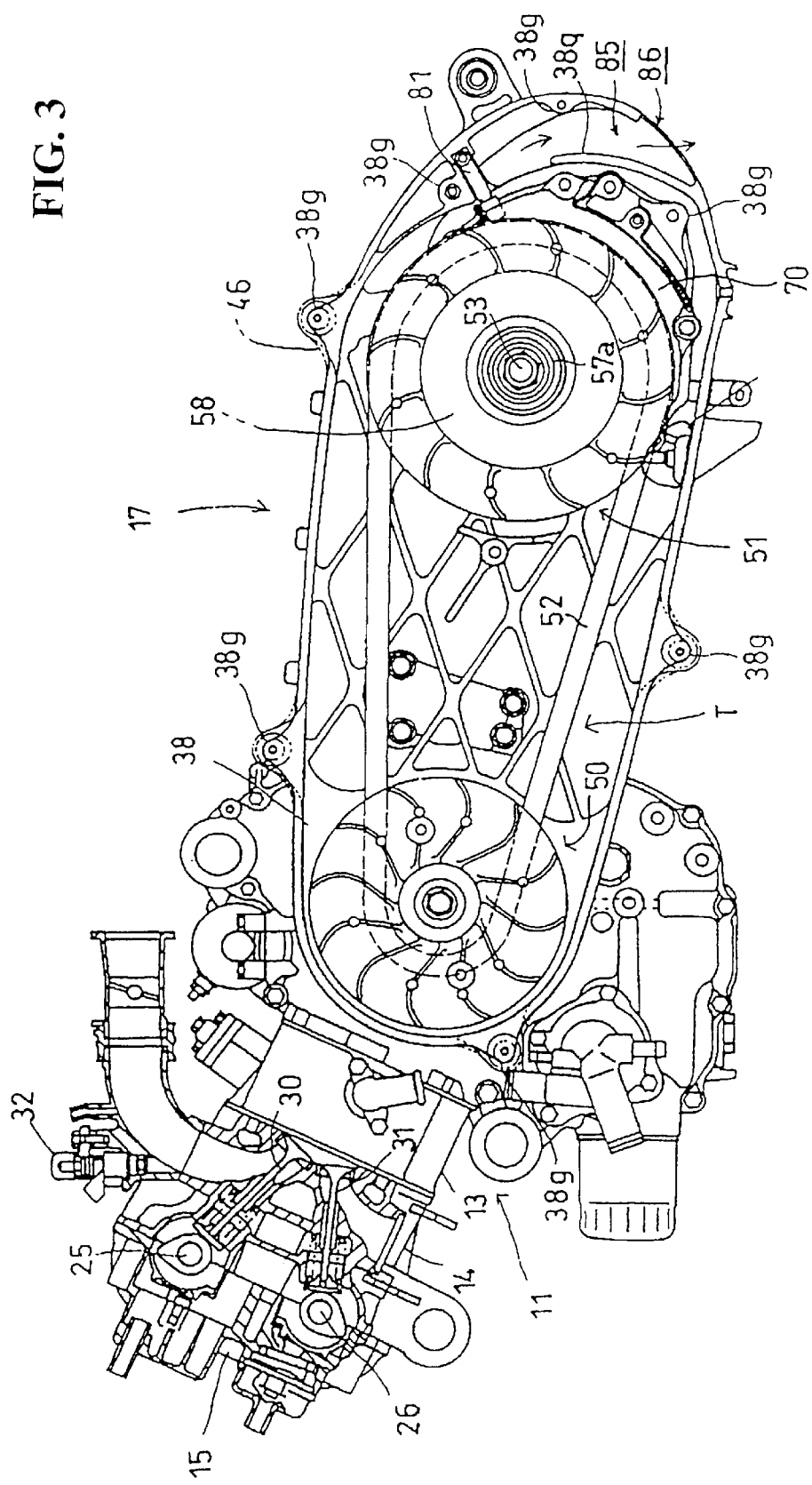
FIG. 3 is a view of a cover unit taken along arrow III in FIG. 2.
Figure 4:
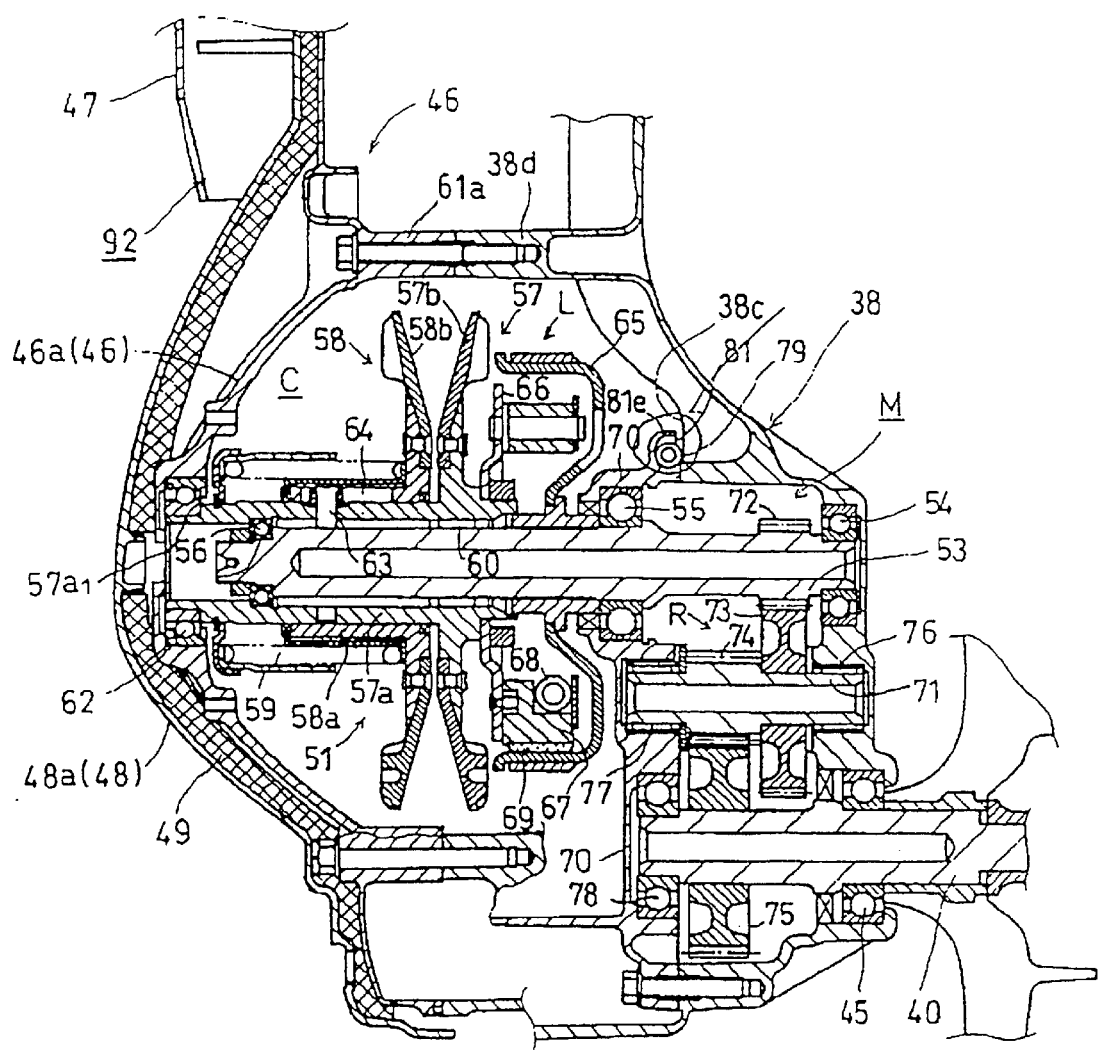
FIG. 4 is an enlarged sectional view of a portion of FIG. 2.
Figure 5:
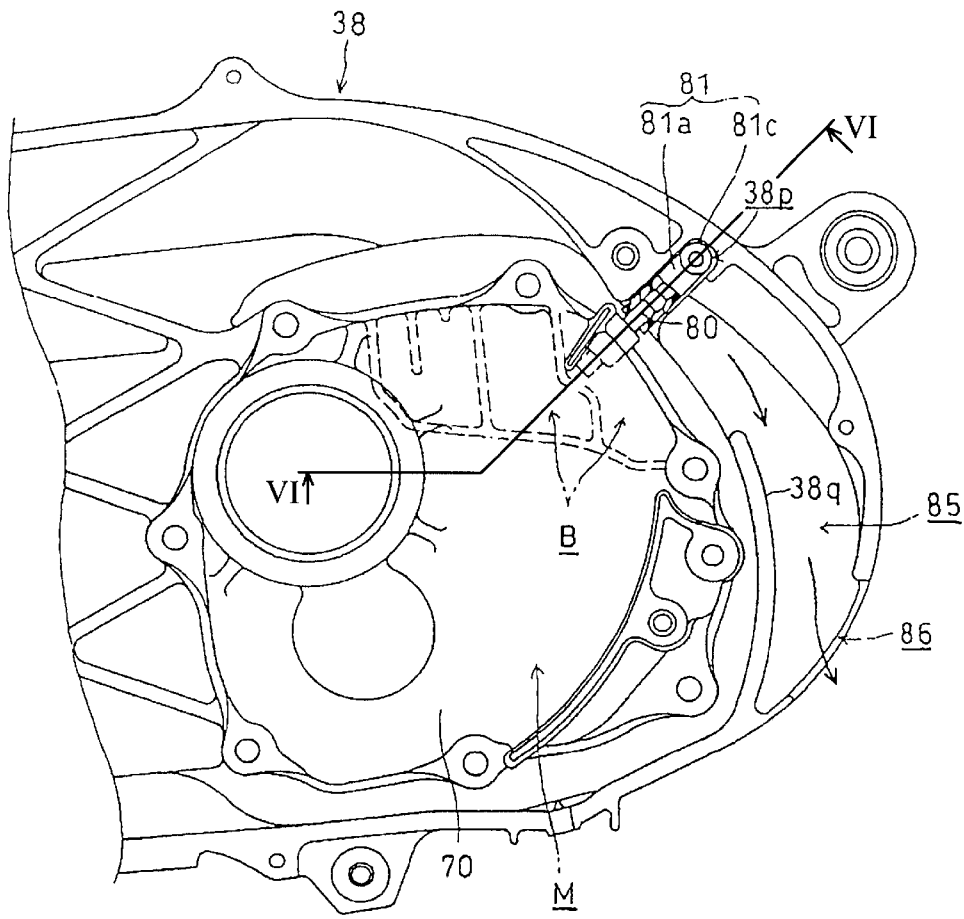
FIG. 5 is a left side view of a transmission cover attached to a left case according to an embodiment of the present invention.
Figure 6:
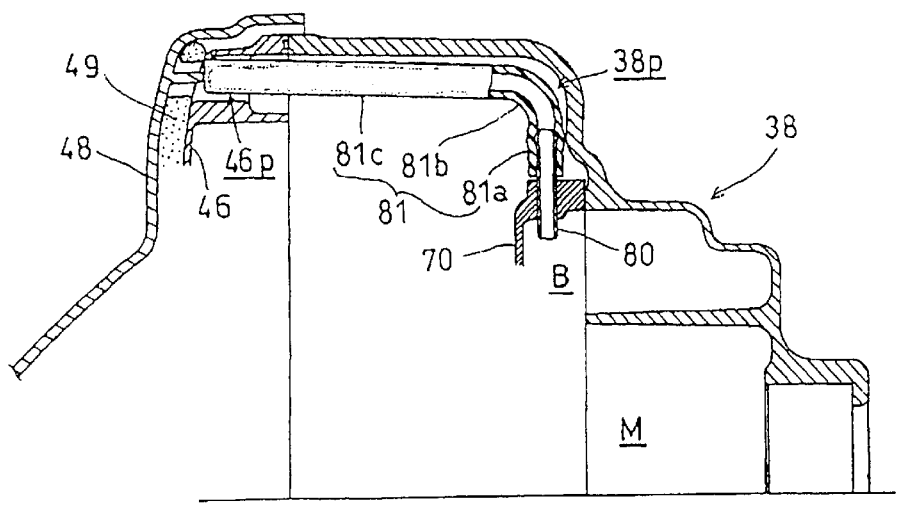
FIG. 6 is a sectional view taken along line VI—VI of FIG. 5 with the cover unit also installed.
Figure 7:
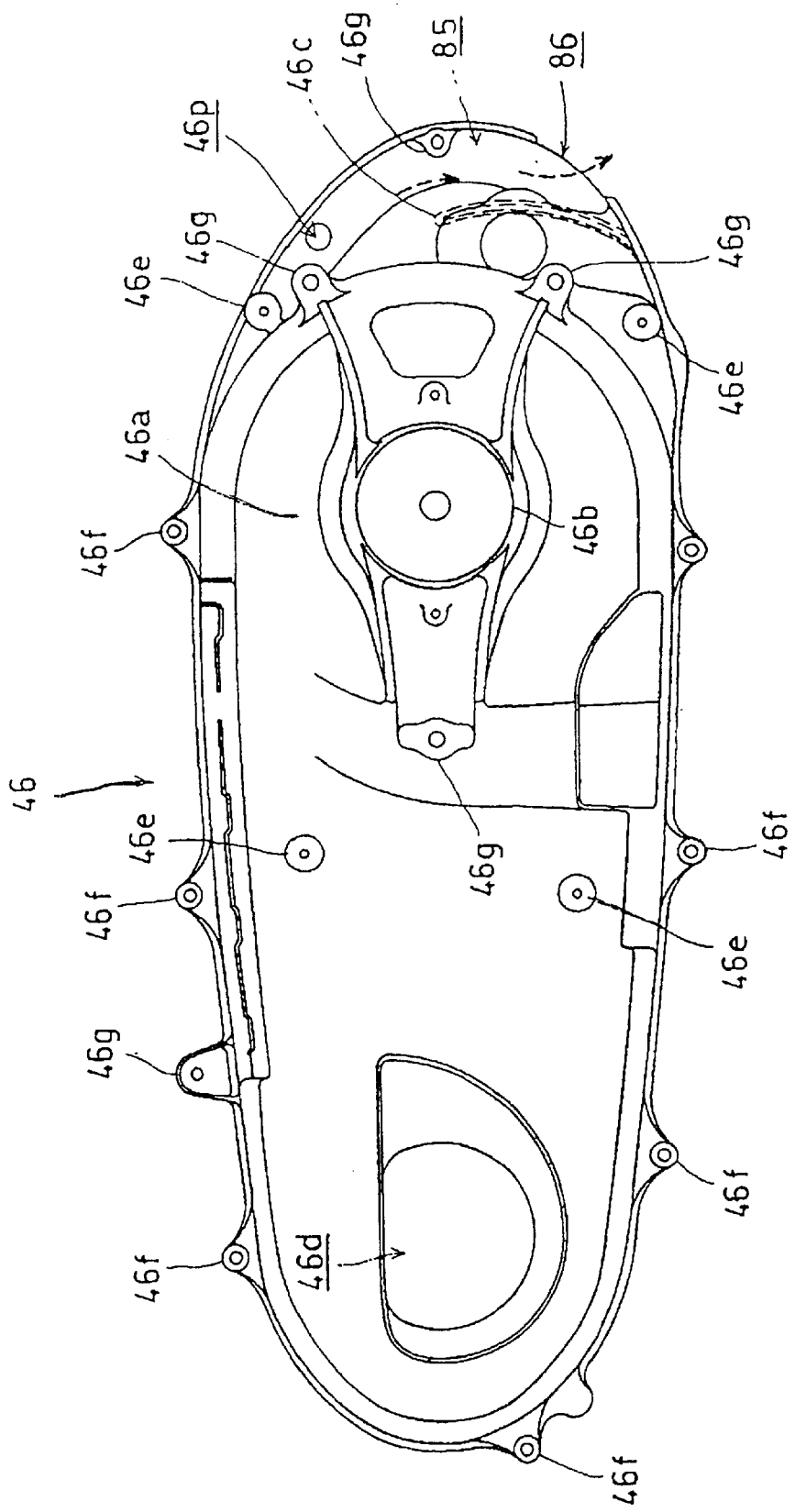
FIG. 7 is a left side view of an inner cover according to an embodiment of the present invention.
Figure 8:
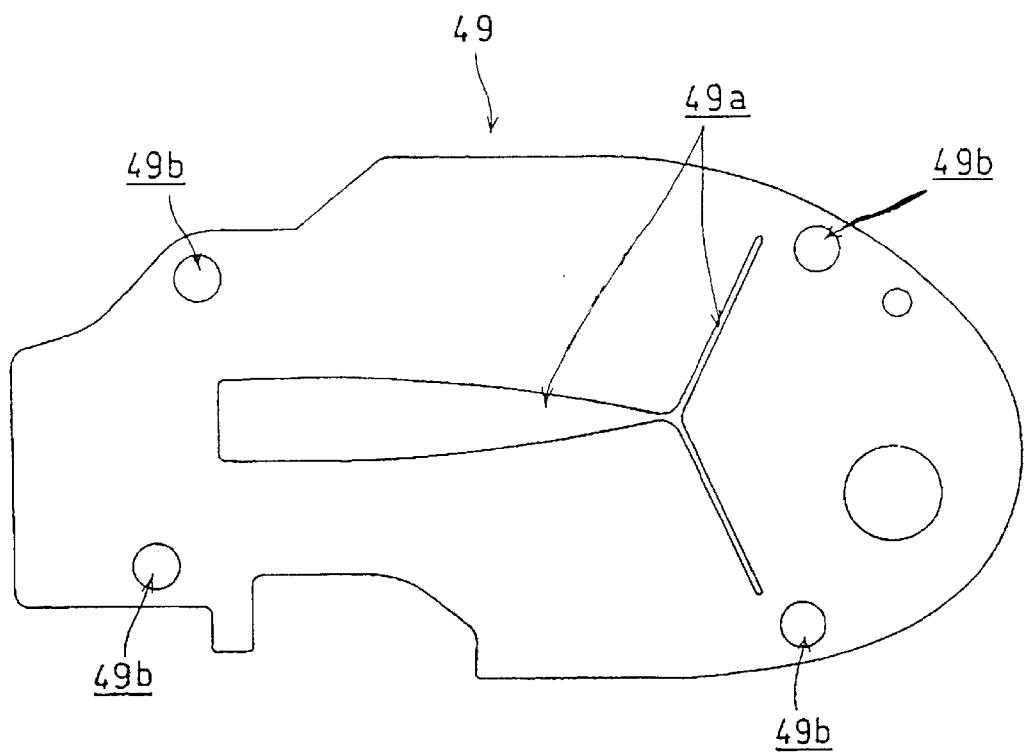
FIG. 8 is a left side view of a sound absorbing material before installation according to an embodiment of the present invention.
Figure 9:
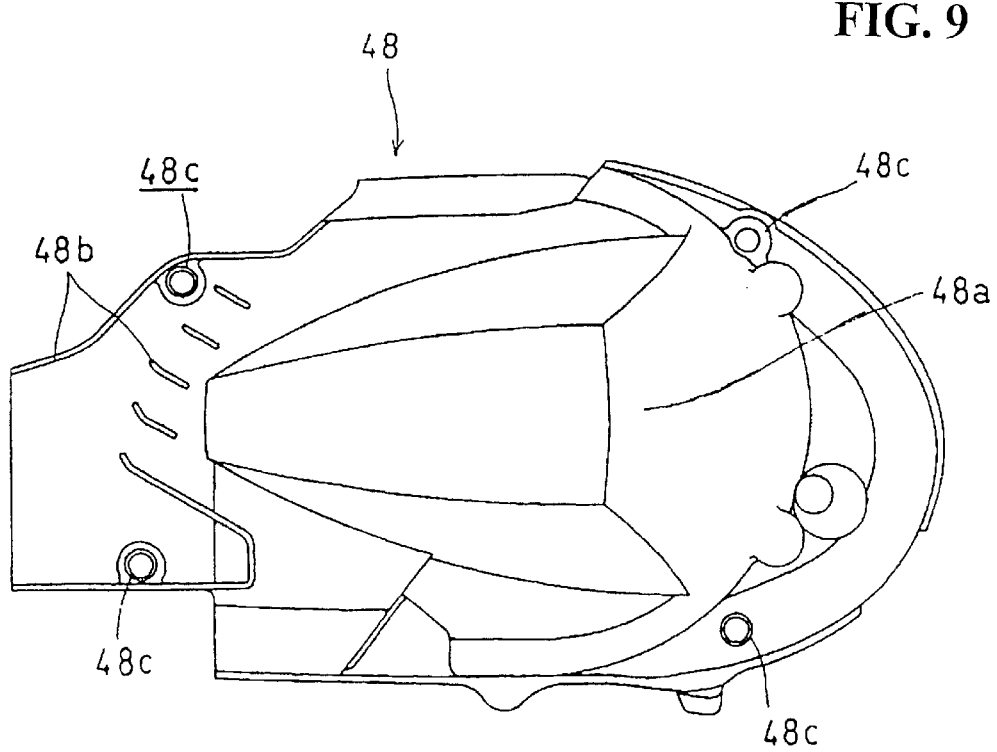
FIG. 9 is a left side view of an outer rear cover according to an embodiment of the present invention.
Figure 10:
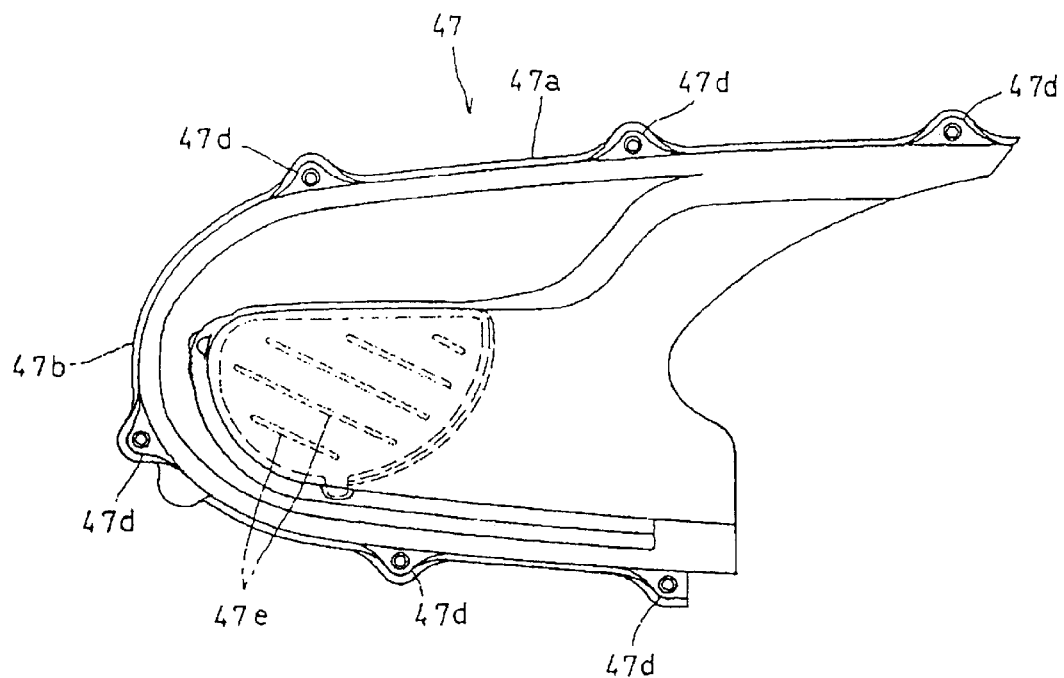
FIG. 10 is a left side view of an outer front cover according to an embodiment of the present invention.
Figure 11:
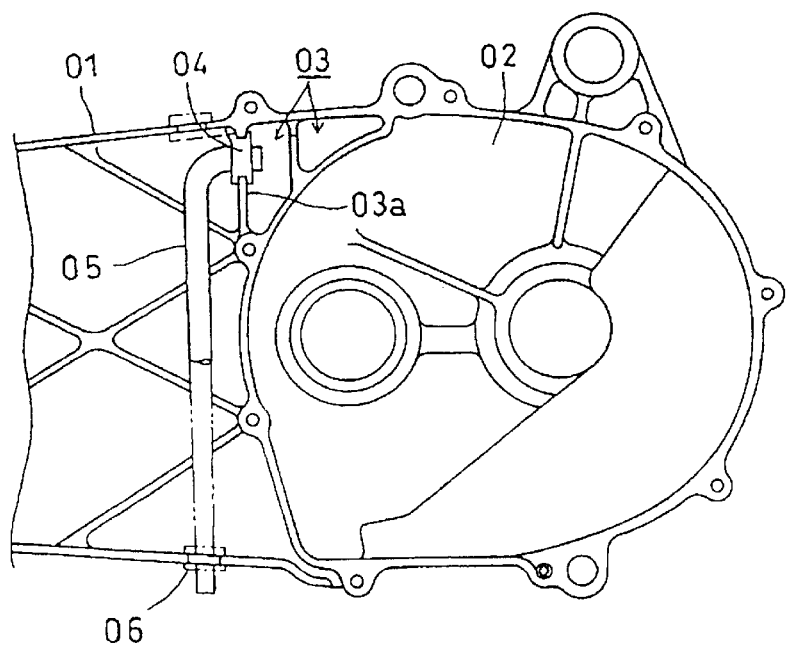
FIG. 11 is a side view of a conventional belt-drive case of the background art.

FIG. 1 is a left side view of a motorcycle mounted with a power transmission device equipped with a belt-drive transmission according to an embodiment of the present invention. FIG. 2 is a sectional view taken along line II—II of FIG. 1. FIG. 3 is a view of a cover unit taken along arrow III in FIG. 2. FIG. 4 is an enlarged sectional view of a portion of FIG. 2. FIG. 5 is a left side view of a transmission cover attached to a left case according to an embodiment of the present invention. FIG. 6 is a sectional view taken along line VI—VI of FIG. 5 with the cover unit also installed. FIG. 7 is a left side view of an inner cover according to an embodiment of the present invention. FIG. 8 is a left side view of a sound absorbing material before installation according to an embodiment of the present invention. FIG. 9 is a left side view of an outer rear cover according to an embodiment of the present invention. FIG. 10 is a left side view of an outer front cover according to an embodiment of the present invention.

FIG. 1 is a left side view of a motorcycle mounted with a power transmission system provided with a belt-drive transmission device according to an embodiment of the present invention. A steering shaft 3 is rotatably supported on a head pipe 2 of a motorcycle 1. A handlebar 4 is fixedly attached on an upper part of the steering shaft 3, and a front fork 5, supporting a front wheel 5, is fixedly attached at a lower part of the steering shaft 3.

Furthermore, the vehicle body frame is provided with a pair of right and left main pipes 7, 7 extending to the rear and obliquely downward from the upper part of the head pipe 2. A pair of right and left support pipes 8, 8 are connected to the main pipes 7, 7 and extend nearly horizontally to the rear from the lower part of the head pipe 2. A pair of right and left down pipes 9, 9 are connected to the support pipes 8, 8. The vehicle body frame further includes a pair of right and left seat rails 10, 10.

The down pipes 9, 9 include front portions 9a, 9a spreading to either side and then extending to the rear obliquely downward at a sharper angle than the main pipes 7, 7, central portions 9b, 9b bent to the rear under the down pipes 9, 9 and then extending nearly horizontally, and rear portions 9c, 9c bent and extending obliquely upward to the rear.

The seat rails 10, 10 are connected a little behind the center of the main pipes 7, 7, and extend rearward nearly obliquely upward to the rear of the vehicle body. The down pipes 9, 9 are connected to the seat rails 10, 10 at the rear end of the rearward portions 9c, 9c at about the central portion of the seat rails 10, 10. Accordingly, the down pipes 9,9 support the seat rails 10,10 from below.

In the internal combustion engine 11, a cylinder block 13, a cylinder head 14, and a cylinder head cover 15 are assembled in order of mention to a crankcase 12. The crankcase 12 is located to the rear of the rear portions 9c, 9c of the down pipes 9, 9. The cylinder block 13, cylinder head 14 and cylinder head cover 15 are disposed projecting, in a forward upward inclined position, forward of the rear portions 9c, 9c of the down pipes 9, 9.

The crankcase 12 is supported on a pair of right and left support brackets 9d, 9d and 9e, 9e mounted at the upper and lower parts of the rear portions 9c, 9c of the down pipes 9, 9. In the front of the internal combustion engine 11, a fuel tank 16 is mounted which is surrounded by the right and left main pipes 7, 7 and the right and left down pipes 9, 9.

On the left side of the vehicle body, as described later, the power transmission device 17 is rotatably supported at the front part of the crankcase 12, on the axis of the crankshaft 22 as an axis of rotation. The power transmission device 17 is disposed slightly obliquely downward to the rear from the left of the crankcase 12.

A rear end portion of the power transmission device 17 is supported through shock absorbers 18 on the rear end portion of the left seat rails 10, 10, so that the power transmission device 17 is vertically swingable in relation to the internal combustion engine 11. A rear wheel 19 is axially supported at the rear of the power transmission device 17.

The internal combustion engine 11 and the power transmission device 17 will be described in greater detail with reference to FIG. 2 to FIG. 4.

As shown in FIG. 2, the internal combustion engine 11 is a four-cycle, two-cylinder internal combustion engine in which the crankcase 12 is split into right and left crankcases 12L and 12R. A reciprocating motion of pistons 20, 20 slidably inserted in the cylinders 13a, 13a of the cylinder block 13 is transmitted to the crankshaft 22. The crankshaft 22 is rotatably and laterally supported in the crankcase 12 through connecting rods 21, 21. A rotor of an alternator 23 is fixedly attached on the right end portion of the crankshaft 22. The right side of the alternator 23 is covered with an alternator cover 24 connected to the right crankcase 12R.

A driving pulley 50 of a later-described V-belt transmission T is mounted on the left end portion of the crankshaft 22. The transmission T is a component element of the power transmission device 17.

Referring to FIG. 3, a valve mechanism is mounted in the cylinder head 14. An intake camshaft 25 and an exhaust camshaft 26 are rotatably supported in the cylinder head 14. The intake 25 and exhaust camshafts 26 are driven to rotate at a reduction ratio of ½ of the crankshaft 22 by a timing chain 29 mounted on a driven sprocket secured on the right end portion of the camshafts 25 and 26 (shown is only a driven sprocket 27 of the intake camshaft 25) and a driving sprocket 28 secured on the right end portion of the crankshaft 22. The intake 25 and exhaust camshafts 26 thereby open two intake valves 30, 30 and two exhaust valves 31, 31, respectively, mounted in the cylinders 13a, 13a.

Fuel injected from a fuel injection valve 32 into the intake passage is drawn together with air into a combustion chamber 33 through intake valves 30, 30. Firing for combustion is provided by a spark plug 34. After combustion is complete, burned gases are discharged into the exhaust passage via exhaust valves 31, 31.

The power transmission device 17 will be explained hereinafter with reference to the accompanying drawings.

The alternator cover 24 connected to the right crankcase 12R is provided with a bearing hole, or through hole formed on the centerline of the axis of the crankshaft 22. A support shaft 36 is rotatably supported on a needle bearing 35 mounted in the bearing hole. The right end portion of the support shaft 36 is fitted in a fitting hole provided at the base end portion 37a of the right case 37 that partly covers the right crankcase 12R. The right case 37 is then fixedly mounted on the support shaft 36.

The right case 37 has a joining section 37b that is routed around from the base end portion 37a to the inside of the vehicle body along the rear surface of the right crankcase 12R. The joining section 37b is joined by four bolts 39 to a joining section 38b of the left case 38 that is a further component member of the transmission case C. The right case 37 is thus joined into one body with the left case 38.

Furthermore, the front end of the right fork portion 42 is bolted to the rear end of the right case 37. The right end of the rear axle 40 is supported on a ball bearing 41 mounted in the rear end of the right fork portion 42.

An annular support member 43 is connected by bolting on the periphery of the crankshaft 22 on the left side of the left crankcase 12L. The left case 38 is rotatably supported in relation to the crankcase 12 by fitting the base end portion 38a of the left case 38 on the outer periphery of the support member 43 through a ball bearing 44.

The left case 38 has the joining section 38b arranged around the inside of the vehicle body from the base end portion 38a along the rear surface of the left crankcase 12L, and further extending to the rear to support the middle portion of the rear axle 40 by a ball bearing 45 at the rear part.

Therefore, the right case 37 and the right fork portion 42, which form the right rear fork section, and the left case 38, which forms the left rear fork section, integrally form the rear fork of the motorcycle 1. The rear fork of the motorcycle is thus vertically, swingably supported with respect to the internal combustion engine 11 on the centerline of the axis of the crankshaft 22.

Furthermore, the left case 38 opens to the left side. The open portion of the left case 38 is covered by a cover unit U. The cover unit U has a double structure including an inner cover 46 which is the body cover covering the open portion of the left case 38 and connected to a joint surface thereof, and an outer front cover 47 and an outer rear cover 48 covering the inner cover 46 on the left with a space provided therebetween. Sound absorbing material 49 for noise suppression is interposed particularly between the inner cover 46 and the outer rear cover 48 covering the rear half part.

In the belt-drive chamber C formed by the left case 38 and the inner cover 46, a V-belt transmission T, a centrifugal clutch L, and a reduction device R are housed. These are component elements of the power transmission device 17 for transmitting the power of the crankshaft 22 to the rear wheel 19.

The transmission T is provided with the driving pulley 50, the driven pulley 51, and a V-belt 52 installed on these pulleys 50 and 51. The driving pulley 50 is mounted on the left end portion of the crankshaft 22 in the front of the belt-drive chamber C. The driving pulley 50 has a stationary pulley piece 50a on the drive side that is secured in the directions of the axis of rotation in relation to the crankshaft 22 as the driving shaft.

The stationary pulley piece 50a has a conical surface in contact with the V-belt 52. A movable pulley piece 50b on the drive side is positioned to the right of the stationary pulley piece 50a on the drive side and is connected so as to be axially movable in relation to the crankshaft 22 and unmovable in the direction of rotation. The movable pulley piece 50b also has a conical surface in contact with the V-belt 52. A ramp plate 50c is fixed in the axial direction and in the direction of rotation in relation to the crankshaft 22 and a plurality of weight rollers 50d are disposed between the movable pulley piece 50b on the drive side and the ramp plate 50c.

The driven pulley 51 is disposed at the rear of the belt-drive chamber C, and is mounted on the left end portion of the driven shaft 53 mounted in the lateral direction of the motorcycle 1. The driven shaft 53 is rotatably supported at the right end portion at the rear part of the left case 38, at the intermediate portion in a later-described transmission cover 70, and further supported at the left end portion in the inner periphery of a later-described inner sleeve 57a via ball bearings 54, 55 and 56.

The ball bearing 54 is a support portion for supporting the driven shaft 53 in the left case 38. Ball bearing 55 is a support portion for supporting the driven shaft 53 in the transmission cover 70.

Furthermore, referring to FIG. 4, the driven pulley 51 has a driven-side stationary pulley piece 57 rotatably and axially secured with respect to the driven shaft 53 and a driven-side movable pulley piece 58 axially movable with respect to the driven-side stationary pulley piece 57 and slightly axially movable within a range of motion of a later-described cam groove 64. A spring 59 having a cylindrical compression coil spring is also provided with a spring pressure applying against the driven-side movable pulley piece 58 toward the driven-side stationary pulley piece 57.

The driven-side stationary pulley piece 57 includes an inner sleeve 57a disposed radially outward on the same axis as the driven shaft 53, and a conical plate 57b secured integrally with the right end portion of the inner sleeve 57a and having a conical surface in contact with the V-belt 52.

The left end portion of the inner sleeve 57a is rotatably supported on the driven shaft 53 through the needle bearing 60 mounted on the inner periphery. A journal portion $57a_1$ which is the outer periphery of the left end portion of the inner sleeve 57a and positioned radially outward of the driven shaft 53 is inserted in a ball bearing 62.

The ball bearing 62 is mounted on the inner periphery of the bearing bore 46 formed in the inner cover 46 and is rotatably supported in the inner cover 46. Therefore, the ball bearing 62 functions as a support portion of the driven-side stationary pulley piece 57 in the inner cover 46.

The driven-side movable pulley piece 58 includes an outer sleeve 58a which is mounted on the same axis as the driven shaft 53 and is slidable in the direction of the axis of rotation of the driven shaft 53 on the outer periphery of the inner sleeve 57a. A conical plate 58b is integrally fixed at the right end portion of the outer sleeve 58a. The conical plate 58b is located on the left of the conical plate 57b of the driven-side stationary pulley piece 57 and has a conical surface in contact with the V-belt 52.

The outer sleeve 58a is provided with a cam groove 64 in which a pin 63 fixed in the inner sleeve 57a is fitted to thereby enable relative movement in the axial direction of the driven-side movable pulley piece 58 in relation to the driven-side stationary pulley piece 57. The cam groove 64 has an inclined portion that allows movement in the directions of axis of rotation when a speed difference between the driven-side stationary pulley piece 57 and the driven-side movable pulley piece 58 exceeds a specific value. The driven-side stationary pulley piece 57 and the driven-side movable pulley piece 58 are normally designed to be rotatable as one body.

When the internal combustion engine 11 is running at a low speed, the drive-side movable pulley piece 50b of the driving pulley 50 is off the drive-side stationary pulley piece 50a. In this case, the wrapping radius of the V-belt 52 becomes relatively small. In the driven pulley 51, the driven-side movable pulley piece 58 being pressed by the spring 59 approaches the driven-side stationary pulley piece 57. This movement increases the wrapping radius of the V-belt 52 and therefore enables a transmission of the power of the crankshaft 22 to the output shaft at a greater transmission gear ratio.

In the driving pulley 50, when the speed of rotation is increased, a plurality of weight rollers 50d are moved radically outward by centrifugal force to push the drive-side movable pulley piece 50b into closer engagement with the drive-side stationary pulley piece 50a. Therefore, the wrapping radius of the V-belt 52 increases to move the driven-side movable pulley piece 58 of the driven pulley 51 against the spring force of the spring 59 away from the driven-side stationary pulley piece 57, thus decreasing the wrapping radius of the V-belt 52 to decrease the transmission gear ratio.

Next, in the driven shaft 53, on the right of the driven-side stationary pulley piece 57 is disposed the centrifugal clutch L. The centrifugal clutch L is a starting clutch positioned between the driven-side stationary pulley piece 57 and the transmission cover 70 that forms the transmission case M holding a later-described reduction device R.

The centrifugal clutch L has a cup-shaped outer clutch 65 that is fixed on the driven shaft 53. The cup-shaped outer clutch 65 rotates as one unit with the driven shaft 53, and a drive plate 66 that is secured on the right end portion of the inner sleeve 57a inside of the outer clutch 65.

Then, when the inner sleeve 57a rotates at a higher speed than the specific speed, a plurality of clutch shoes 67 rock ably supported by the drive plate 66 are swung radically outward by a centrifugal force against the spring force of the clutch spring 68. A friction member 69 used on the outer peripheral surface of each clutch shoe 67 contacts the inner peripheral surface of the outer clutch 65, thus engaging the centrifugal clutch L to transmit the rotation of the driven pulley 51 to the driven shaft 53.

Furthermore, the driven shaft 53 is connected with the rear axle 40 through a series of gears constituting the reduction device R. The transmission case M is further provided at the rear of the belt-drive chamber C. The transmission case M is located between the rear part of the left case 38 and the centrifugal clutch L and is formed by the transmission cover 70.

The reduction device R housed in the transmission case M is provided with a small-diameter first pinion located on the right end portion of the driven shaft 53 which is mounted through the transmission cover 70, a large-diameter first reduction gear 73 and a small-diameter second pinion 74 mounted on an intermediate shaft 71 which is retractably supported at both ends on needle bearings 76 and 77 in the left case 37. The reduction device R also includes the transmission cover 70, and a large-diameter second reduction gear 75 mounted on the rear axle 40 and retractably supported on the ball bearings 45 and 78 in the left case 38 and the transmission cover 70.

The first pinion 72 is in mesh with the first reduction gear 73, and the second pinion 74 is in mesh with the second reduction gear 75, whereby the rotation of the driven shaft 53 is transmitted to the rear axle 40 after speed reduction in two speeds.

The power of the crankshaft 22 is inputted into the driving pulley 50 of the transmission T by this power transmission device 17. After automatically changing to a transmission gear ratio by the transmission T according to the speed of the internal combustion engine 11, the power of the crankshaft 22 is transmitted to the driven pulley 51 and further to the driven shaft 53 through the centrifugal clutch L. Subsequently, the rotation of the driven shaft 53 is transmitted to the rear axle 40 after speed reduction through the reduction device R in the transmission case M.

The lubricating oil is reserved in the transmission case M. A series of gears constituting the reduction device R are partly immersed for lubrication within the lubricating oil. Therefore, a breather mechanism is provided to connect the interior of the transmission case M to the outside air in order to prevent a pressure rise in the transmission case M when the lubricating oil temperature rises during operation of the power transmission device 17.

As shown in FIG. 5 and FIG. 6, a partition wall in a space located above the transmission case M defines a breather chamber B. In the rear upper part of the breather chamber B, a connecting pipe 80 is fitted in through the peripheral wall of the transmission cover 70, protruding obliquely upward toward the rear. The connecting pipe 80 communicates the inside and outside, respectively, of the transmission case M with the lower end of the connecting pipe 80 located in the breather chamber B and the upper end disposed outside of the transmission case M.

In a part of the connecting pipe 80 protruding out upward one end of the breather pipe 81 is pressed for connection. The breather pipe 81 shown in FIG. 6 is an L-bent pipe, with the end of a short straight portion 81a pressed for connection in the connecting pipe 80. A long straight portion 81c extends horizontally for a specific length through a bent portion 81b.

The long straight portion 81c is routed along the inside surface of the rear peripheral wall of the left case 38, and the left case 38 has a guide groove 38p formed to guide the breather pipe 81 which is extended from the connecting pipe 80.

The long straight portion 81c of the breather pipe 81 extending horizontally to the right protrudes further to the left beyond the joint face of the left case 38 as shown in FIG. 6 and is inserted into the round hole 46p of the inner cover 46.

The round hole 46p of the inner cover 46 faces the sound absorbing material 49 for noise suppression interposed between the inside cover 46 and the outer rear cover 48. The end opening of the breather pipe 81 is inserted in the round whole 46p and is located in the sound absorbing material 49.

The breather pipe 81 extends obliquely upward in connection with the connecting pipe 80. The breather pipe 81 communicates with the breather chamber B and is bent squarely along the guide groove 38p, then extends horizontally to the left for a specific length. Inserted in the round hole 46p of the inner cover 46 is the left end portion, with the outlet in the left end portion located in the sound absorbing material installed in the inside surface of the outer rear cover 48.

The sound absorbing material 49 has a round hole 49c in a part where the outlet in the left end portion of the breather pipe 81 is located, so that a rib protruding out of the inner surface of the outer rear cover 48 will not close the outlet.

Since the guide groove 38p serves as a stopper, the breather pipe 81 will not drop off. When the breather pipe 81 is installed, one end of the breather pipe 81 is connected to the transmission cover 70 through the connecting pipe 80 and is fitted for supporting in the guide groove 38p. Therefore, the breather pipe 81 can be reliably and easily installed.

The sound absorbing material 49 installed on the inside of the outer rear cover 48 is disposed at the outlet of the breather pipe 81. Therefore, it is possible to prevent the entry and attachment of dusts at the outlet of the breather pipe 81. Accordingly, the appearance of the breather pipe 81 will not be adversely affected by the accumulation of dust, particulate or debris.

The upstream side of the breather pipe 81 is extended nearly upward from the upper breather chamber B of the transmission case M. Therefore, oil/liquid content that has entered the breather pipe 81 can easily flow back into the transmission case M. The breather pipe 81, together with the transmission case M, rocks up and down to allow easy return of the oil liquid content into the transmission case M.

Furthermore, the breather pipe 81, after extending nearly upward, is bent to form a long horizontal portion 81c extending to the pipe outlet for a specific length. Therefore, air-liquid separation takes place in the long horizontal portion 81c, thereby further improving the breather performance.

The long horizontal portion 81c of the breather pipe 81 extends to the pipe outlet. Therefore, the oil will not be forced out by the up-down oscillation of the breather pipe 81.

The sound absorbing material 49, which adsorbs the oil content, is dried by the air-cooling structure in the belt-drive chamber C. The air-cooling structure together with the cover unit U connected to the left case 38 will be explained hereinafter.

The cover unit U is of a double structure including the inner cover 46, the outer front cover 47, and the outer rear cover 48. The sound absorbing material 49 is interposed between the cover 46 and the outer rear cover 48.

The inner cover 46, as shown in FIG. 7, covers the left open space of the left case 38 in which the transmission T is housed. The rear half part of the left case 38 bulges leftward into a cup shape to cover the driven pulley 51. The bearing portion 46b is mounted at the center of the bulged portion 46a by which the left end portion of the inner sleeve 57a is retractably supported.

The rib 46c of the bulged portion 46a which is further curved to the rear inner surface protrudes to form an air discharge passage 85 between the rib 46c and the rear peripheral wall. The air discharge passage 85 guides the air downward from above along the rear peripheral wall to thereby discharge the air at the air outlet 86 formed in the rear lower part.

The left case 38 jointed to the inner cover 46 is also provided with a rib 38q which is formed correspondingly to the rib 51c (shown in FIG. 3). Both ribs together form the air discharge passage 85 and the air discharge port 86.

A round hole 46p is formed in the upper part of the air discharge passage 85. The end portion of the breather pipe 81 is inserted into the round hole 46p. In the front part of the inner cover 46 is formed an air inlet 46d.

At about the center of the bearing portion 46b are formed mounting bosses 46e for mounting the external rear cover 48 in four places: two at upper and lower places on the front side and another two at upper and lower places on the rear side. Mounting bosses 46f for mounting the outer front cover 47 are provided at six places about the front peripheral edge of the inner cover 46 for mounting the outer front cover 47. On the inner cover 46 are also formed mounting bosses 46g at five places for mounting the left case 38.

Mounting bosses 38g for mounting the inner cover 46 or the inner cover 46 and the outer front cover 47 together (shown in FIG. 3) are also formed on the left case 38.

The outer rear cover 48 covering the rear half of the inner cover 46 has a bulged portion 48a at the central part as shown in FIG. 9 and a guide portion 48b formed in the forward extended portion to thereby prevent the entrance of foreign substances and to guide the flow of air.

Mounting bosses 48c are provided in four places of the outer rear cover 48. Two mounting bosses 48 at upper and lower places on the front side and another two mounting bosses 48 at upper and lower places on the rear side. On the back side of the outer rear cover 48, the sound absorbing material 49 is lined as shown in FIG. 8.

The sound absorbing material 49 is formed flat in shape, and has, at the center, an approximately Y-shaped slit 49a. Furthermore round holes 49b are formed in positions corresponding to the mounting bosses 48c provided in four places.

In the vicinity of the right lower part of the round hole 49b formed in the right upper part in FIG. 8, a round hole 49c is formed in which the outlet in the end portion of the breather pipe is located. The sound absorbing material 49 is lined by being deformed into a cup shape along the inner surface by spreading the slit 49a in the bulged portion 48a of the outer rear cover 48.

The outer rear cover 48 lined with the sound absorbing material 49 is installed on the rear half of the inner cover 46 mounted on the left case 17. The outer rear cover 48 is tightened by screws into one body with mutually corresponding four mounting bosses 46f and 48c matching each other.

The outer front cover 47 to be installed at the front half of the inner cover 46 bulges slightly leftward into an approximately dish-like shape as shown in FIG. 10. The outer front cover 47 has a lower peripheral wall 47c through the front peripheral wall 47b which is curved from the upper peripheral wall 47a and then opens at the rear peripheral edge.

The peripheral walls 47a, 47b and 47c are provided with mounting bosses 47d in six places, and several ribs 47e are formed in parallel to each other and obliquely to the inner surface of the front half of the outer front cover 47.

Next, as shown FIG. 2, an air-cleaning element 90 is in contact with the end face of the several ribs 47e, and an element holding cover 91 presses to support the air-cleaning element 90 against the ribs 47e.

After the outer rear cover 48 is mounted on the rear half of the inner cover 46, the outer front cover 47 is attached by screws with the mounting bosses 46f and 47d matched at six mutually corresponding places, overlapped on the front end portion of the outer rear cover 48 and partly on the front half of the inner cover 46.

The inner cover 46, the outer front cover 47 and the outer rear cover 48 form a double structure with the sound absorbing material 49 and the air-cleaning element 90 interposed therebetween. Thus the cover unit U is integrally installed.

As shown in FIG. 2, there is formed an outside air inlet opening 92 which is open to the rear between the rear peripheral edge open to the outer front cover 47 and the outer rear cover 48. The element holding cover 91 attached to support the air-cleaning element 90 to the front half of the outer front cover 47 is fitted in the air inlet 46d of the inner cover 46.

With the reduction device R, the transmission cover 70, the driven shaft 53, the centrifugal clutch L, and the driven pulley 51 installed to the left case 38 (shown in FIG. 3); the inner cover 46, the outer rear cover 48 and the outer front cover 47 are installed in order of mention to thereby attach the cover unit U. Thus, the sound absorbing material 49 of the cover unit U forms a sound insulation construction for lessening noise resulting from vibrations of the transmission T and the reduction device R housed in the belt-drive chamber C.

When the transmission cover 70 is installed to the left case 38, a breather pipe 81 is pre-installed to the connecting pipe 80 inserted in the transmission cover 70. Next, the transmission cover 70 is installed while fitting the breather pipe 81 in the guide groove 38p of the left case 38.

Thereafter, when the cover unit U is installed, the end portion of the breather pipe 81 protrudes a little out of the joint surface of the left case 38 and is inserted into the round hole 46p of the inner cover 46. Subsequently, the end opening of the breather pipe 81 is placed at the sound absorbing material 49 inside of the outer rear cover 48.

With the cover unit U thus installed to the left case 38, the air inlet 46d provided in the front part of the inner cover 46, and the air-cleaning element 90, are located oppositely to the left end of the crankshaft 22. A cooling fin 50a' (shown in FIG. 2) installed on the back of the stationary pulley half 50a of the driving pulley 50 mounted on the left end of the crankshaft 22 rotates to function as a blower.

Therefore, with the rotation of the cooling fin 50a', the outside air is drawn in at the air inlet 92 in the rear edge of the outer front cover 47. The air drawn in is guided forward by means of the guide portion 48b formed in the front part of the outer rear cover 48 and into the belt-drive case C after cleaning by the air-cleaning element 90. The air introduced into the belt-drive case C flows through the air discharge passage 85 in the rear part of the belt-drive case C after cooling the V-belt 52 and the component elements of the power transmission device 17 of the transmission T. The air is then discharged out at the air outlet 86.

In the above-described air-cooling structure, the sound absorbing material 49 is exposed, at the upstream of the air discharge passage 85, to warm air used for cooling the transmission T.

Oil content is adsorbed by the sound absorbing material 49 located at the outlet of the breather pipe 81. The sound absorbing material 49 that absorbs the liquid/oil content is dried by the warm air from the air-cooling structure. Accordingly, the adsorbing performance of the sound absorbing material 49 can be preserved for a longer period of time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A breather structure for a power unit for vehicles, said breather structure comprising:
   a body cover having an outer side, said body cover covering the power unit;
   an outer cover mounted to said outer side;
   a sound absorbing material layer interposed between an inner surface of said outer cover and said body cover for noise suppression, and
   a breather assembly having an outlet provided in said power unit, the outlet of said breather provided in said power unit and opening in said sound absorbing material.

2. The breather structure according to claim 1, wherein said breather structure is mounted on a transmission case of the power unit on the driven pulley side of a belt-drive transmission and extending to a breather chamber of the transmission case.

3. The breather structure according to claim 2, said breather assembly further comprising:
   a pipe inlet connected to the breather chamber,
   a breather pipe having an upwardly extending portion extending substantially upward from the breather chamber of said transmission case,
   a pipe outlet, and
   a horizontally extending portion extending for a specific length to the pipe outlet.

4. The breather structure according to claim 3, wherein said pipe outlet of said breather pipe opens within said sound absorbing material interposed between the inside surface of said outer cover and said body cover.

5. A power unit for vehicles comprising:
   a case enclosing a crankcase of an internal combustion engine and a transmission chamber of said power unit;
   a cover unit covering said case, said cover unit including an inner cover, an outer front cover, and an outer rear cover covering said inner cover;
   a space formed between said outer rear cover and said inner cover;
   a sound absorbing material layer interposed within said space for noise suppression;
   a transmission cover and a breather chamber;
   a connecting pipe fitted through a peripheral wall of the transmission cover, and a lower end of said connecting pipe communicating said breather chamber with an outside of said transmission case via an upper end of said connecting pipe; and
   an L-bent breather pipe having a short straight portion, a long straight portion, a bent portion, and an outlet, wherein said outlet terminates in said sound absorbing layer.

6. The power unit according to claim 5, wherein said long straight portion is routed along an inside surface of said case, said case having a guide groove formed to guide the breather pipe and serving as a stopper for said breather pipe.

7. A power unit for vehicles comprising:
- a case enclosing a crankcase of an internal combustion engine and a transmission chamber of said power unit;
- a cover unit covering said case, said cover unit including an inner cover, an outer front cover, and an outer rear cover covering said inner cover;
- a space formed between said outer rear cover and said inner cover;
- a sound absorbing material layer interposed within said space for noise suppression;
- a transmission cover and a breather chamber;
- a connecting pipe fitted through a peripheral wall of the transmission cover, and a lower end of said connecting pipe communicating said breather chamber with an outside of said transmission case via an upper end of said connecting pipe; and
- an L-bent breather pipe having a short straight portion, a long straight portion, a bent portion, and an outlet, said long straight portion being routed along an inside surface of said case, said case having a guide groove formed to guide the breather pipe and serving as a stopper for said breather pipe, and said long straight portion extending horizontally for a specific length through said bent portion and said short straight portion extending upwardly from said connecting pipe, wherein said outlet terminates in said sound absorbing layer.

8. The power unit according to claim 7, wherein said inner cover has a round hole for receiving said breather pipe.

9. The power unit according to claim 7, wherein said inner cover has a round hole for receiving said breather pipe and said sound absorbing layer has a second round hole for receiving said breather pipe, said outlet of said breather pipe terminating in said second round hole of said sound absorbing material.

10. A breather structure for a power unit for vehicles having a belt-drive chamber with an air-cooled structure, said breather structure comprising:
- a body cover having an outer side, said body cover covering the power unit;
- an outer cover mounted to said outer side;
- a sound absorbing material layer interposed between an inner surface of said outer cover and said body cover for noise suppression,
- a breather assembly on a transmission case mounted on a driven pulley side of a belt drive transmission of said power unit, an outlet of said breather assembly opening in said sound absorbing material and formed at a cooled-air outlet port of said belt-drive chamber.

* * * * *